United States Patent
Wang

(10) Patent No.: US 11,465,539 B2
(45) Date of Patent: Oct. 11, 2022

(54) ARMREST FOR CAR SEATS

(71) Applicant: HYUNDAI TRANSYS INC., Seosan-si (KR)

(72) Inventor: Teh Chiang Wang, Hwaseong-si (KR)

(73) Assignee: HYUNDAI TRANSYS INC., Chungcheongnam-Do (KR)

( * ) Notice: Subject to any disclaimer, the term of this patent is extended or adjusted under 35 U.S.C. 154(b) by 0 days.

(21) Appl. No.: 17/227,614

(22) Filed: Apr. 12, 2021

(65) Prior Publication Data

US 2021/0347286 A1 Nov. 11, 2021

(30) Foreign Application Priority Data

May 8, 2020 (KR) .......................... 10-2020-0055126

(51) Int. Cl.
*B60N 2/75* (2018.01)

(52) U.S. Cl.
CPC ............. *B60N 2/767* (2018.02); *B60N 2/753* (2018.02)

(58) Field of Classification Search
CPC ................................. B60N 2/767; B60N 2/753
See application file for complete search history.

(56) References Cited

U.S. PATENT DOCUMENTS

| | | | | |
|---|---|---|---|---|
| 4,872,727 A * | 10/1989 | Rye | ........................... | A47C 1/03 297/301.1 |
| 5,076,645 A * | 12/1991 | Yokota | ................... | B60N 2/753 297/411.32 |
| 5,169,207 A * | 12/1992 | Rye | ........................... | A47C 1/03 297/411.33 |
| 5,636,899 A * | 6/1997 | Schiff | ....................... | B60N 2/77 248/118 |
| 8,403,416 B2 * | 3/2013 | Muck | ...................... | B60N 2/753 297/411.32 |
| 9,758,074 B1 * | 9/2017 | Lin | ......................... | B60N 2/933 |
| 10,131,259 B1 * | 11/2018 | Han | ...................... | B60N 2/4235 |
| 10,889,219 B2 * | 1/2021 | Boddenberg | .......... | B60N 2/0224 |
| 2006/0290190 A1 * | 12/2006 | Zuccato | .................... | A47C 1/03 297/411.36 |
| 2018/0056830 A1 * | 3/2018 | Cripe | ...................... | F16C 11/10 |
| 2021/0347286 A1 * | 11/2021 | Wang | ..................... | B60N 2/753 |

FOREIGN PATENT DOCUMENTS

KR 1020160025219 A 3/2016

* cited by examiner

*Primary Examiner* — Philip F Gabler

(57) ABSTRACT

The present disclosure relates to an armrest for car seats including a connection bracket coupled to a car seat, a rest body connected to the connection bracket so as to be turnable about a fourth axis of rotation, a third cam connected to the rest body so as to be turnable about the fourth axis of rotation, a gas cylinder connected to the third cam, the gas cylinder being configured to be extended and contracted in a longitudinal direction, and a manipulation button installed at the rest body, the manipulation button being configured to manipulate the gas cylinder.

4 Claims, 15 Drawing Sheets

ARMREST FOR CAR SEATS

CROSS-REFERENCE TO RELATED APPLICATION

This application claims, under 35 U.S.C. § 119(a), the benefit of priority to Korean Patent Application No. 10-2020-0055126 filed on May 8, 2020, the entire contents of which are incorporated herein by reference.

BACKGROUND

(a) Technical Field

The present disclosure relates to an armrest for car seats, and more particularly to an armrest for car seats configured such that the angle of the armrest relative to a car seat is finely adjusted using a gas cylinder, thereby improving convenience of a passenger sitting on the seat.

(b) Background Art

In general, an armrest for vehicles includes a console armrest disposed between a driver seat and a passenger seat, a rear armrest foldably mounted between left and right rear seats, and an armrest directly mounted at a separate seat.

For the armrest directly mounted at the separate seat, an arm of a person sitting on the seat may be rested on the armrest. The armrest may be mounted at each of the opposite sides of a seat back.

One end of the armrest is rotatably coupled to the seat. The armrest is rotated about the coupling portion such that the open end of the armrest is moved upwards or downwards. At this time, the angle of the armrest may be adjusted depending on the convenience of a passenger.

In the state in which the armrest is raised perpendicularly to the seat, it is possible to secure a movement line of a passenger who wishes to sit on the seat or wishes to exit a vehicle and to improve space utilization. In the state in which the armrest is lowered in the horizontal state, it is possible to comfortably support an arm of a passenger sitting on the seat.

FIG. 1 is a side view of a conventional armrest for car seats.

Referring to FIG. 1, the conventional armrest 200 for car seats includes a rest body 210, the rear end of which is coupled to a seat 100 via a rotary shaft 222, a cam 220 coupled to the rest body 210 so as to be rotatable about the same shaft as the rotary shaft 222, the cam 220 being provided at the outer surface thereof with a fixing protrusion 221 configured to contact a stopper 111 provided at the seat in order to limit a front rotation angle of the rest body 210, a gas cylinder 230 having one end coupled to the cam 220 via a hinge 225 and the other end coupled to front end of the rest body 210, and a manipulation button 240 provided at front end of the rest body 210, the manipulation button 240 being connected to an operation portion 235 of the gas cylinder 230. The gas cylinder 230 is contracted or extended according to manipulation of the manipulation button 240, whereby the rotation angle of the rest body 210 relative to the seat is adjusted.

PRIOR ART DOCUMENT

Patent Document (Patent Document 1) Korean Patent Application Publication No. 10-2016-0025219 (Publication Date: 2016 Mar. 18)

The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

It is an object of the present invention to provide an armrest for car seats configured such that the axis of rotation of a rest body and the axis of rotation of a cam configured to adjust multistage rotation of the armrest are located at different positions, whereby force necessary to adjust multistage rotation of the armrest is reduced.

It is another object of the present invention to provide an armrest for car seats such that a cam has a two-bar link structure, whereby operation force through indirect driving is reduced, and the length of the armrest is further increased through adjustment of the rotational position of the link.

It is a further object of the present invention to provide an armrest for car seats such that the armrest can be rotated until the armrest is pushed back in parallel to a car seat in both a horizontal state and a downwardly inclined state of the armrest.

The objects of the present invention are not limited to those described above, and other unmentioned objects of the present invention will be clearly understood by a person of ordinary skill in the art (hereinafter referred to as an "ordinary skilled person") from the following description.

In order to accomplish the object, in an aspect, the present invention provides an armrest for car seats, the armrest including a connection bracket coupled to a car seat, a rest body connected to the connection bracket so as to be turnable about a fourth axis of rotation, a third cam connected to the rest body so as to be turnable about the fourth axis of rotation, a gas cylinder connected to the third cam, the gas cylinder being configured to be extended and contracted in a longitudinal direction, and a manipulation button installed at the rest body, the manipulation button being configured to manipulate the gas cylinder, wherein the third cam includes a second guide bar protruding from one end of the third cam, the second guide bar extending through a rest body guide hole formed in the rest body and a second guide hole formed in the connection bracket, the second guide bar being configured to limit a rotation angle of the armrest, the third cam includes a first coupling portion, at which the fourth axis of rotation is formed, a second coupling portion, at which the second guide bar is formed, and a third coupling portion directly connected to the gas cylinder, and the first coupling portion, the second coupling portion, and the third coupling portion form a triangular shape.

The first coupling portion may be located ahead of the second coupling portion and may be located higher than the third coupling portion.

The rest body may include a first guide bar coupled to one surface of the rest body, the first guide bar being inserted into a first guide hole formed in the connection bracket, the first guide bar being configured to limit a turning angle of the armrest.

The first guide hole may be disposed closer to the fourth axis of rotation than the second guide hole.

The first guide hole may have a smaller radius of curvature than the second guide hole.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
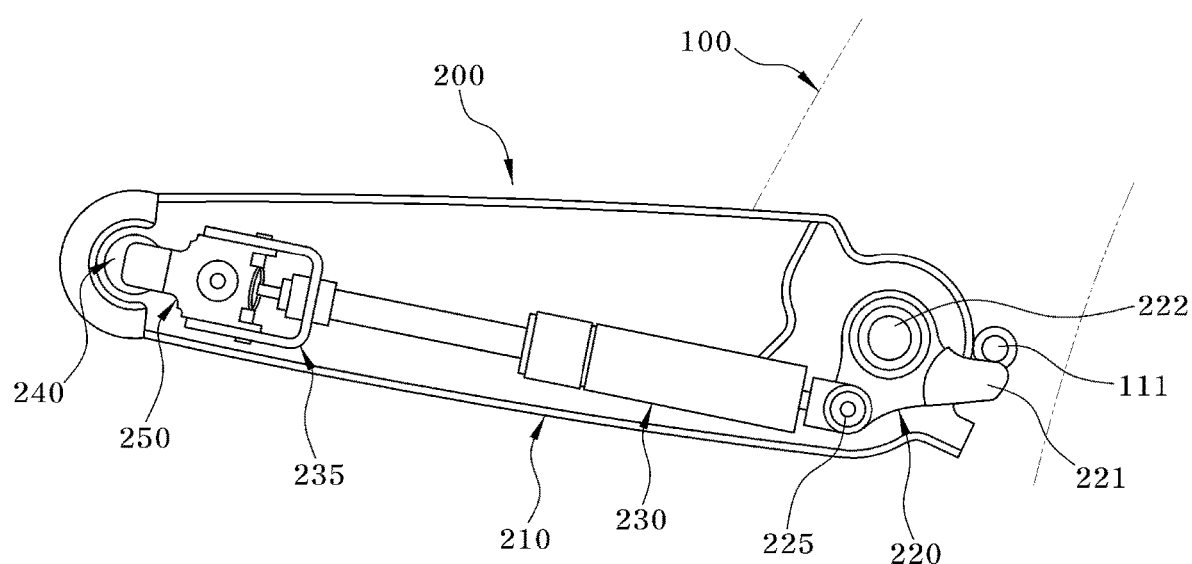
FIG. 1 is a side view of a conventional armrest for car seats.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first", "second", etc., which are used in the description and the claims of the present application for disclosure, are not intended to indicate any sequence, amount or importance, but distinguish various components. The terms "comprise", "comprising", "include", "including", etc., are intended to specify that the elements or the objects stated before these terms encompass the elements or the objects and equivalents thereof listed after these terms, but do not preclude the other elements or objects. "On", "under", "right", "left" and the like are only used to indicate relative position relationship, and when the position of the object which is described is changed, the relative position relationship may be changed accordingly.

Figure 2:
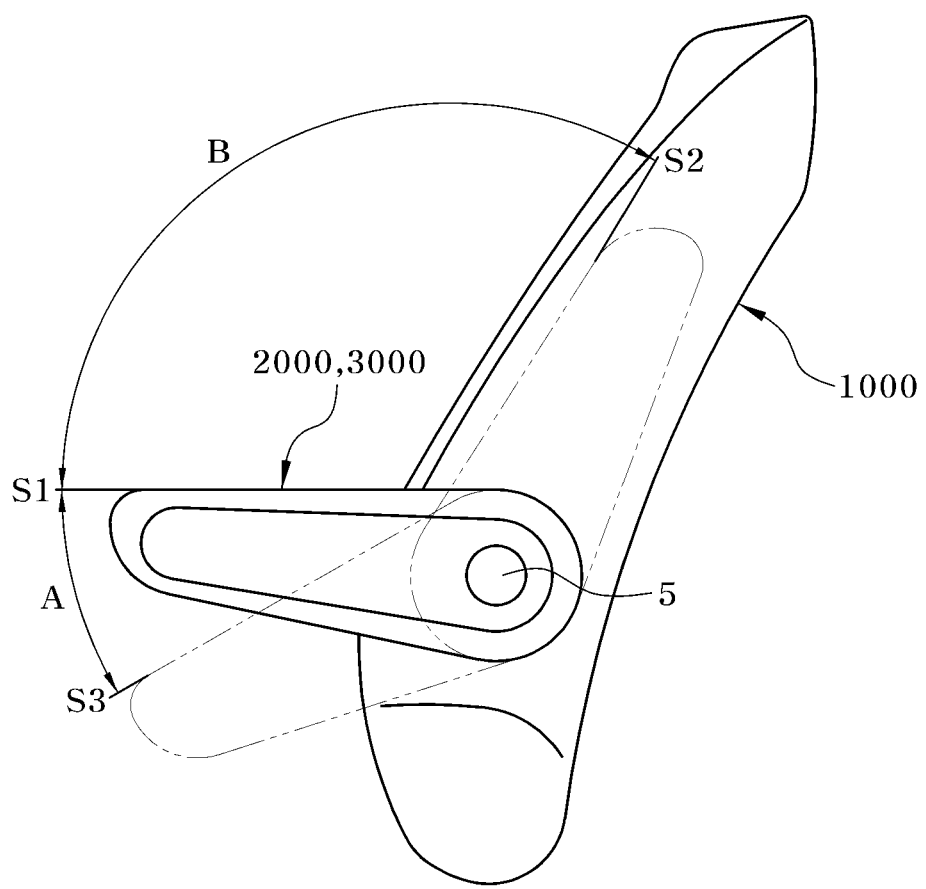
FIG. 2 is a view showing the operation of an armrest for car seats according to the present invention.

FIG. 2 is a view showing the operation of an armrest for car seats according to the present invention.

Referring to FIG. 2, one end of the armrest 2000 or 3000 for car seats according to the present invention may be rotatably connected to a car seat 1000, and the other end thereof may be rotated upwards or downwards. The armrest 2000 or 3000 may be freely rotated upwards or downwards from the horizontal state S1 thereof. When rotated upwards, the armrest 2000 or 3000 may be rotated to the same angle as the car seat 1000 (S2). When rotated downwards, the armrest 2000 or 3000 may be rotated downwards (S3) more than the horizontal state (S1) to comfortably support an arm of a passenger.

State S1 may be defined as the withdrawal state of the armrest, state S2 may be defined as the reception state of the armrest, and state S3 may be defined as the multistage adjustment state of the armrest in which the armrest is inclined downwards by about 30 degrees. The armrest 2000 or 3000 for car seats according to the present invention may be rapidly, easily, and forcibly rotated in a free angle adjustment section B between the horizontal state (S1) and the state in which the armrest is folded so as to be parallel to the car seat 1000 (S2), and comfort of a passenger who wishes to sit in a desired seat posture based on their physical properties may be further improved through manipulation of the armrest in a multistage angle adjustment section A between the horizontal state (S1) and the state in which the armrest is adjusted forwards by a predetermined angle (S3).

Figure 3:
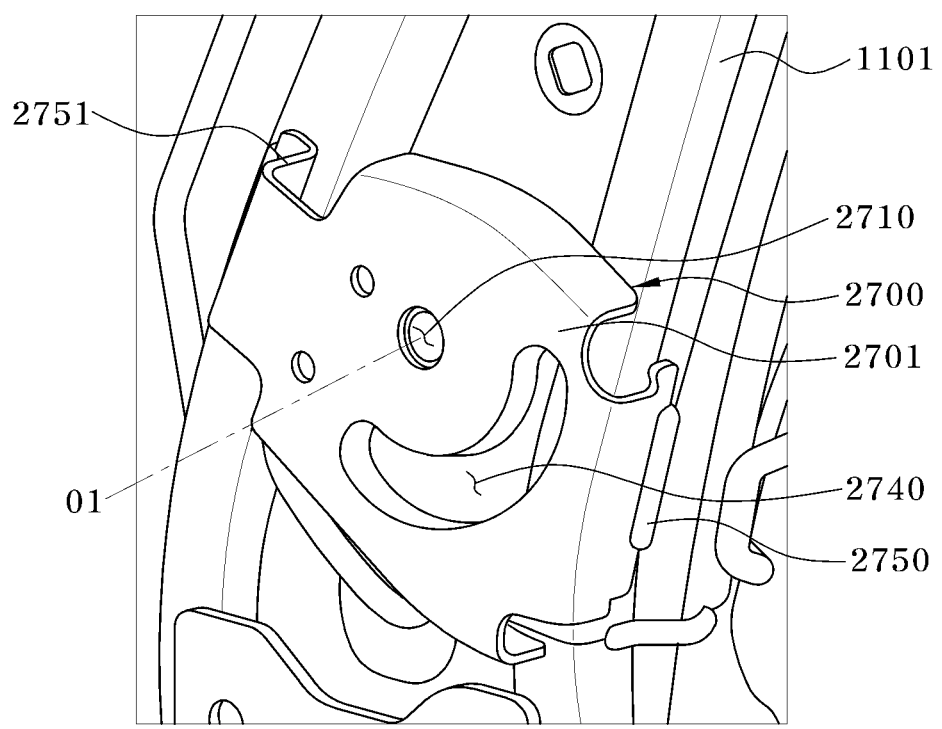
FIG. 3 is a perspective view of a bracket for car seats according to an embodiment of the present invention.

FIG. 3 is a perspective view of a bracket for car seats according to an embodiment of the present invention. FIG.

4 is an internal perspective view showing some components of an armrest for car seats according to an embodiment of the present invention. Hereinafter, the armrest 2000 for car seats according to the embodiment of the present invention will be described.

The armrest 2000 for car seats according to the embodiment of the present invention may include a rest body 2100, a first cam 2200, a second cam 2300, a gas cylinder 2400, a manipulation button 2500, an operation bracket 2600, and a seat bracket 2700.

Referring to FIG. 3 the seat bracket 2700, which is a structure configured to install the armrest 2000 at a seat 1000 (see FIG. 2), may be detachably fixed to the seat 1000. The seat bracket 2700 installed at the seat 1000 may support weight of the armrest 2000 rotatably fixed to the seat bracket 2700.

The seat bracket 2700 may include a seat bracket body 2701 and fixing clips 2750 and 2751 fixedly coupled to a frame 1101 of the seat 1000. The fixing clips 2750 and 2751 may be formed respectively at the front end and the rear end of the seat bracket body 2701 in a forward-rearward direction of the seat.

The seat bracket 2700 may include a bracket center hole 2710 and a bracket guide hole 2740 formed in the seat bracket body 2701. The bracket center hole 2710 is a hole into which a turning bar 2720 configured to serve as an axis of rotation 01 of the armrest 200 is turnably inserted. The bracket guide hole 2740 may have an arc shape of a predetermined angle about the bracket center hole 2710. The bracket guide hole 2740 serves as a stopper that limits the possible rotation angle of the armrest 2000 when the armrest 2000 is rotated about the axis of rotation 01 in a clockwise direction or in a counterclockwise direction.

Figure 4:
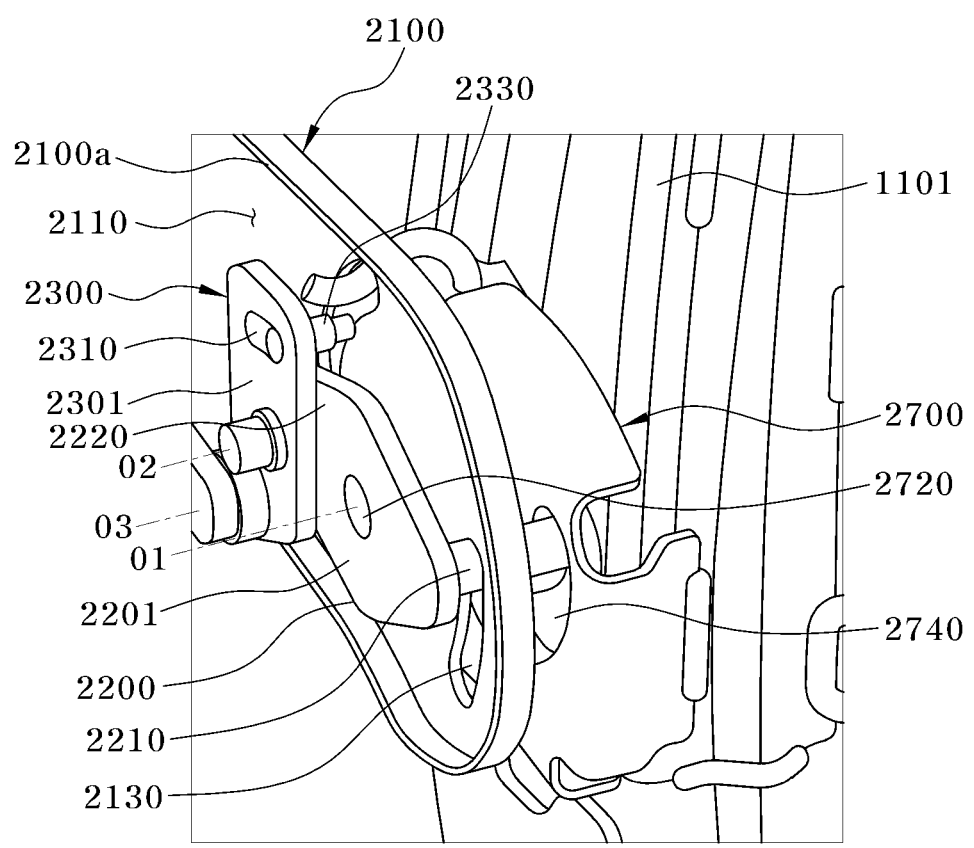
FIG. 4 is an internal perspective view showing some components of an armrest for car seats according to an embodiment of the present invention.

As shown in FIG. 4, the first cam 2200 may be connected to the bracket guide hole 2740 of the seat bracket 2700 so as to be turnable about the axis of rotation 01.

The first cam 2200 may include a first cam body 2201, a first cam coupling portion 2220 formed at one end of the first cam body 2201, and a cam guide bar 2210 formed at the other end of the first cam body 2201.

The first cam body 2201 may have a shape extending long in one direction. The axis of rotation 01 may be formed at a central portion of the first cam body 2201. The first cam body 2201 may have a flat shape in the forward-rearward direction of the seat 1000. When viewed from the left side or the right side, the first cam body 2201 may have a diamond shape.

The first cam coupling portion 2220, which is one end of the first cam body 2201, is turnably connected to the second cam 2300, and forms a second axis of rotation 02. The second axis of rotation 02 may be formed in a leftward-rightward direction of the seat, and may be formed parallel to the first axis of rotation 01.

The cam guide bar 2210 may have a shape protruding toward the seat bracket 2700, and may be formed in an inward direction in which a passenger is located in the leftward-rightward direction of the seat. The cam guide bar 2210 may extend through a guide hole 2130 of the rest body and may extend through a bracket guide hole 2740 of the seat bracket 2700.

When the armrest 2000 is rotated upwards or downwards, the cam guide bar 2210 may be guided in the bracket guide hole 2740, and may limit the rotation angle of the armrest 2000 to the upper side or the lower side of the armrest 2000.

Referring to FIG. 4, the second cam 2300 is turnably connected to the first cam coupling portion 2220 of the first cam 2200, which is the second axis of rotation 02. The second cam 2300 may include a second cam body 2301, a second cam hole 2310 formed in one end of the second cam body 2301, and a second cam turning portion 2320 formed at the other end of the second cam body 2301.

The second cam body 2301 may have a shape extending long in one direction. The axis of rotation 02 may be formed at a central portion of the second cam body 2301. The second cam body 2301 may have a flat shape in the forward-rearward direction of the seat 1000. When viewed from the left side or the right side, the second cam body 2301 may have a rectangular shape. The second cam body 2301 is installed farther away from the seat bracket 2700 than the first cam body 2201.

The second cam hole 2310 is formed in one end of the second cam body 2301 spaced apart from the second axis of rotation 02, and may limit the rotation angle of the second cam 2300. The length from the second axis of rotation 02 to the second cam hole 2310 and the length from the second axis of rotation 02 to the second cam turning portion 2320 may be less than the length from the second axis of rotation 02 to the cam guide bar 2210. The second cam hole 2310 may be formed higher than the second axis of rotation 02.

A turning stopper 2330 fixed to the seat bracket 2700 may be inserted into the second cam hole 2310, and may serve to limit turning of the second cam 2300. The second cam hole 2310 may have an arc shape of a predetermined angle about the second axis of rotation 02.

The gas cylinder 2400, a description of which will follow, is turnably connected to the second cam turning portion 2320. The second cam turning portion 2320 may be formed lower than the second axis of rotation 02. Since the second cam turning portion 2320 is formed outside the second cam 2300, the gas cylinder 2400 may be connected to the outside of the second cam 2300.

Figure 5:
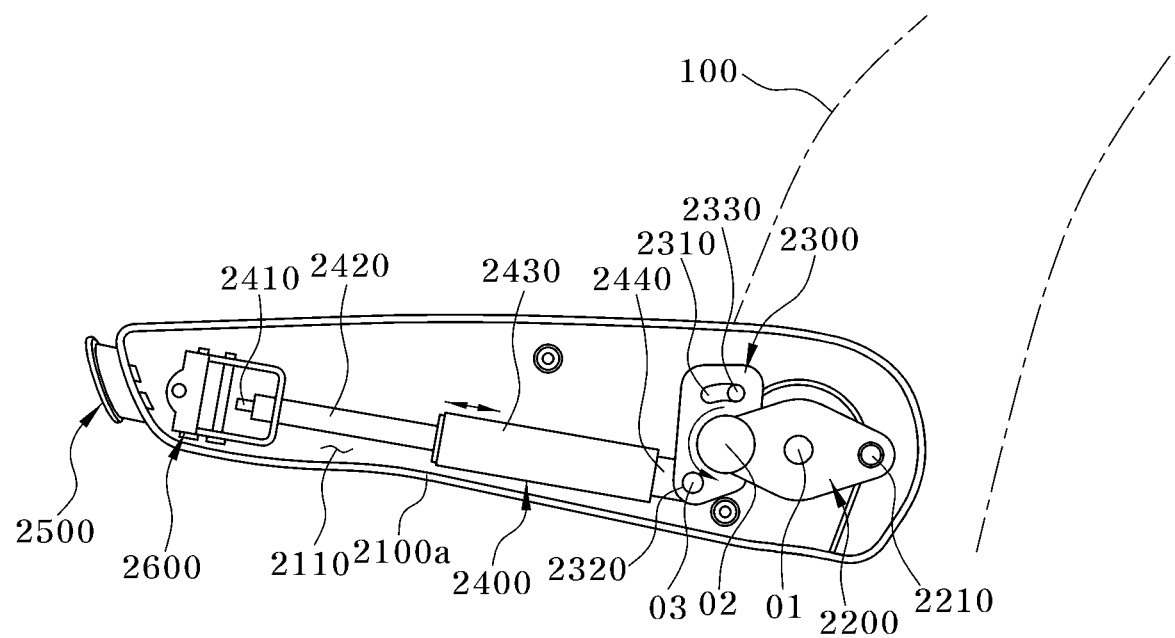
FIG. 5 is a view showing the horizontal state of the armrest for car seats according to the embodiment of the present invention.
Figure 6:
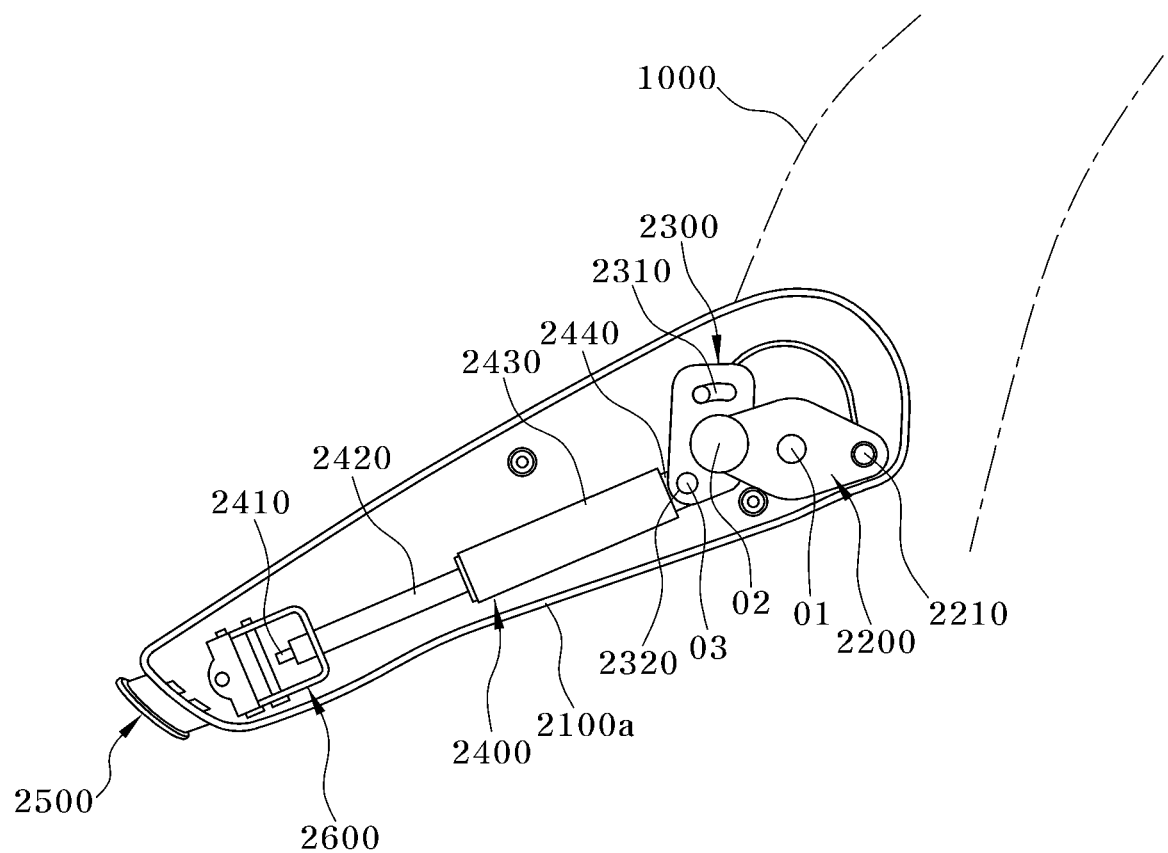
FIG. 6 is a view showing the state in which the armrest for car seats according to the embodiment of the present invention is rotated downwards.

FIG. 5 is a view showing the horizontal state of the armrest for car seats according to the embodiment of the present invention. FIG. 6 is a view showing the state in which the armrest for car seats according to the embodiment of the present invention is rotated downwards.

Referring to FIGS. 5 and 6, the rest body 2100 according to the embodiment of the present invention, which is a frame configured to support an arm of a passenger, may have an inner space 2110, in which the first cam 2200, the second cam 2300, the gas cylinder 2400, and the operation bracket 2600 may be installed, formed therein. The inner space 2110 means a space to be formed as the result of coupling between a first frame 100a of the rest body 2100, which is inwardly of the passenger, and a second frame (not shown) of the rest body 2100, which is outwardly of the passenger.

The rest body 2100 may be connected to the seat bracket 2700 so as to be turnable about the first axis of rotation 01. The rest body 2100 may include a rest body guide hole 2130, into which the cam guide bar 2210 is inserted. The rest body guide hole 2130 may have an arc shape of a predetermined angle so as to limit the movement range of the cam guide bar 2210. The center of the arc of the rest body guide hole 2130 is located on the first axis of rotation 01.

The gas cylinder 2400 may be disposed in the inner space 2110 in a longitudinal direction of the rest body 2100. The rear end of the gas cylinder 2400 may be turnably connected to the second cam 2300, and the front end thereof may be connected to the operation bracket 2600. The second cam 2300 is rotated about the second axis of rotation 02 according to contraction and extension of the gas cylinder 2400. The gas cylinder 2400 may include an operation portion 2410 configured to change the flow path of inner gas according to positional movement thereof, a piston rod 2420 configured to be contracted and extended depending on an inner gas pressure difference, a cylinder 2430 configured to store gas therein, the piston rod 2420 extending through the cylinder 2430, and a cylinder connection portion 2440 provided at the end of the cylinder 2430, the cylinder connection portion 2440 being turnably connected to the second cam 2300.

The manipulation button 2500, which is a member configured to manipulate the gas cylinder 2400, may be provided at one side surface of the front end of the rest body 2100 at which an arm of a passenger sitting on the seat 1000 can be comfortably located.

The operation bracket 2600 may be provided between the manipulation button 2500 and the operation portion 2410 in order to transmit pressure of the manipulation button 2500 to the operation portion 2410 of the gas cylinder 2400.

Hereinafter, the operation of the armrest 2000 for car seats according to the embodiment of the present invention will be described.

In the case in which the armrest 2000 for car seats according to the embodiment of the present invention is in a horizontal state, as shown in FIG. 5, torque is applied to the second cam 2300 about the second axis of rotation 02 in the counterclockwise direction by the extended gas cylinder 2400, and the second cam 2300 remains in the maximally rotated state while no longer being rotated by the turning stopper 2330. Also, in this case, movement of the cam guide bar 2210 of the first cam 2200 is limited by the upper end of the bracket guide hole 2740 of the seat bracket 2700, whereby the position of the armrest 200 is fixed in the horizontal state (see FIG. 4).

When the manipulation button 2500 is pushed, as shown in FIG. 6, the armrest 2000 for car seats according to the embodiment of the present invention may be rotated downwards from the horizontal state.

When the manipulation button 2500 is pushed, the operation portion 2410 of the gas cylinder 2400 is pushed by the operation bracket 2600 connected to the manipulation button 2500, the gas flow path in the gas cylinder is secured, and the piston rod 2420 is in a movable state. When the armrest 2000 is pushed downwards in the state in which the manipulation button 2500 is pushed, the length of the gas cylinder 2400 is reduced, whereby the second cam 2300 is rotated about the second axis of rotation 02 in the clockwise direction. As a result, the armrest 2000 may be rotated about the first axis of rotation 01 in the counterclockwise direction, and therefore the armrest 2000 may be rotated downwards. In this case, the rotation angle of the armrest 2000 in the counterclockwise direction may be proportional to the rotation angle of the second cam 2300 in the clockwise direction.

When force applied to the manipulation button 2500 is released during rotation of the armrest 2000, the operation portion 2410 returns to the original position thereof and the gas flow path in the cylinder is closed, whereby movement of the piston rod 2420 is stopped. In addition, contraction of the gas cylinder 2430 is stopped, whereby the length of the gas cylinder 2430 is fixed, and therefore rotation of the second cam 2300 is limited. Consequently, rotation of the armrest 2000 is interrupted and is fixed in the state in which the current angle thereof is maintained.

In the armrest 2000 for car seats according to the embodiment of the present invention, force may be applied to the armrest 2000 such that the armrest is rotated upwards in the state in which the manipulation button 2500 is pushed, whereby the armrest 2000 may be rotated upwards. When the manipulation button 2500 is pushed, the gas cylinder 2400 is in a contractible and extensible state. When force is applied to the armrest 2000 such that the armrest 200 is rotated in the clockwise direction, the length of the gas cylinder 2400 increases, whereby the second cam 2300 is rotated to the maximum extent in the counterclockwise direction, as shown in FIG. 5.

The armrest 2000 for car seats according to the embodiment of the present invention may be rotated to state S2 in a direction parallel to the seat. When force is applied to the armrest 2000 such that the armrest 2000 is rotated in the clockwise direction without pushing the manipulation button 2500 in the horizontal state shown in FIG. 5, the armrest 2000 is rotated about the first axis of rotation 01, and movement of the cam guide bar 2210 of the first cam 2200 is limited by the lower end of the bracket guide hole 2740 of the seat bracket 2700, whereby the maximum rotation angle of the armrest 2000 in the clockwise direction is limited.

The armrest 2000 for car seats according to the embodiment of the present invention may be rotatably connected to the car seat 1000, and the angle of the armrest 2000 may be changed such that the armrest 2000 can be rotated upwards or downwards from the car seat 1000. In addition, the first axis of rotation 01 of the armrest 2000 and the second axis of rotation 02 of the cam configured to adjust multistage rotation of the armrest 2000 may be located at different positions, whereby force necessary to adjust multistage rotation of the armrest 2000 may be reduced.

Figure 7:
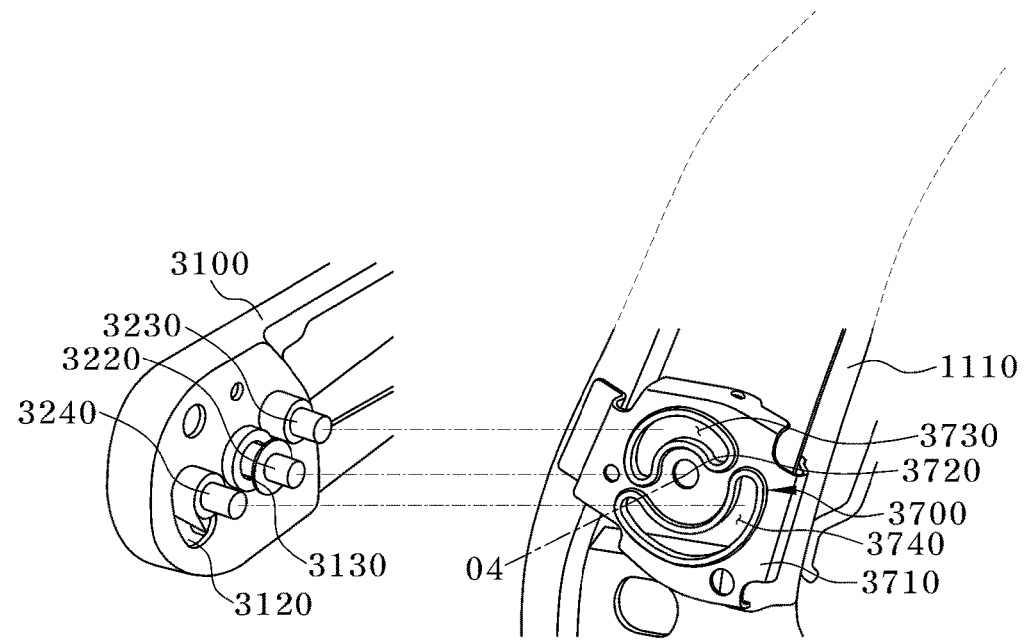
FIG. 7 is a detailed view of an armrest for car seats according to another embodiment of the present invention.
Figure 8:
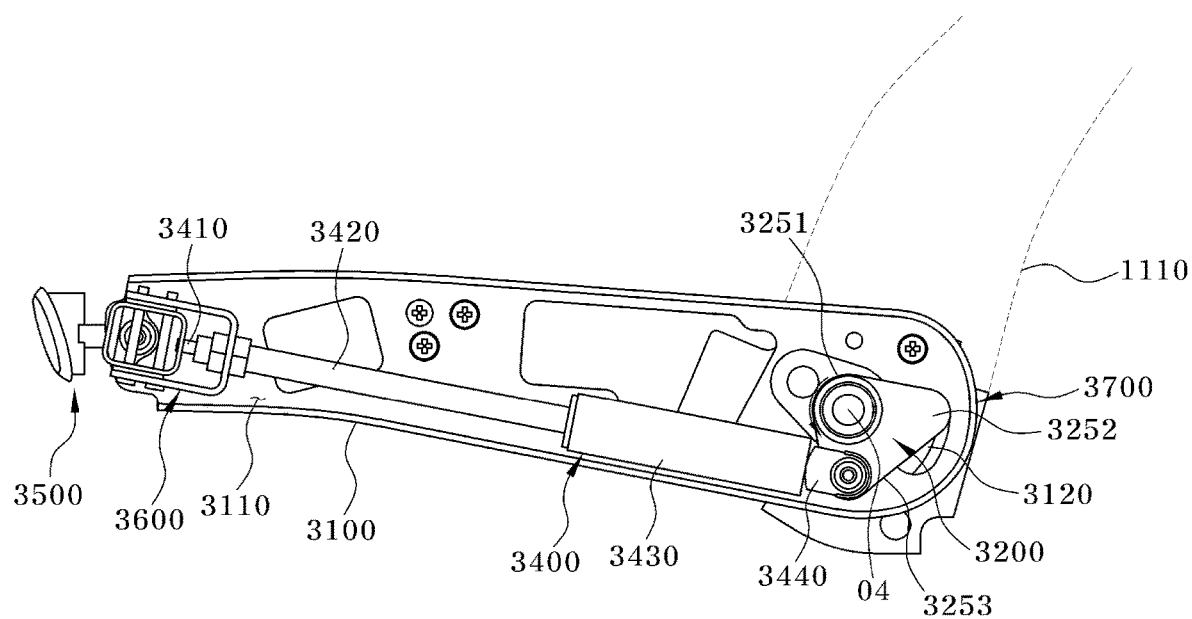
FIG. 8 is a side view of the armrest for car seats according to the other embodiment of the present invention.

FIG. 7 is a detailed view of an armrest for car seats according to another embodiment of the present invention. FIG. 8 is a side view of the armrest for car seats according to the other embodiment of the present invention. Hereinafter, the armrest 3000 for car seats according to the other embodiment of the present invention will be described with reference to FIGS. 7 and 8.

The armrest 3000 for car seats according to the other embodiment of the present invention may include a rest body 3100, a third cam 3200, a gas cylinder 3400, a manipulation button 3500, an operation bracket 3600, and a connection bracket 3700.

Referring to FIG. 7, the connection bracket 3700, which is a structure configured to install the armrest 3000 at the seat 1000, may be detachably fixed to the seat 1000.

The connection bracket 3700 may include a connection bracket body 3710, a center hole 3720 formed in the connection bracket body 3710, a first guide hole 3730 formed in the connection bracket body 3710, and a second guide hole 3740 formed in the connection bracket body 3710.

The connection bracket body 3710 may be detachably coupled to a seat frame of the seat 1000, and may be made of a metal material or a reinforced plastic material in order to support weight of the armrest.

The center hole 3720 is a hole into which a center bar 3220 configured to serve as an axis of rotation 04 of the armrest 3000 is inserted. The center bar 3220 connects the rest body 3100 and the third cam 3200 to the connection bracket 3700 so as to be turnable about the fourth axis of rotation 04.

The first guide hole 3730 may have an arc shape of a predetermined first angle about the center hole 3720. The second guide hole 3740 may have an arc shape of a predetermined second angle about the center hole 3720. The first guide hole 3730 may be disposed closer to the center hole 3720 than the second guide hole 3740. The predetermined first angle may be less than the predetermined second angle. The first guide hole 3730 may be disposed higher than the second guide hole 3740.

The first guide hole 3730 may have a smaller radius of curvature than the second guide hole 3740.

A first guide bar 3230, a description of which will follow, is inserted into the first guide hole 3730, and guides and limits movement of the first guide bar 3230. A second guide bar 3240, a description of which will follow, is inserted into the second guide hole 3740, and guides and limits movement of the second guide bar 3240.

The first guide hole 3730 may be a guide hole of the bracket, and the second guide hole 3740 may be an auxiliary guide hole of the bracket. The first guide bar 3230 may be a guide bar of the rest body, and the second guide bar 3240 may be a guide bar of the cam.

Referring to FIGS. 7 and 8, the rest body 3100 is a structure configured to serve as a frame of the armrest 3000. The manipulation button 3500 and the operation bracket 3600, a description of each of which will follow, may be fixedly coupled to the rest body 3100. The rest body 3100 may have a shape having a height gradually decreasing toward the front, and may have a thin flat shape extending in the leftward-rightward direction.

The manipulation button 3500 may be coupled to the front end of the rest body 3100, and the fourth axis of rotation 04 of the armrest 3000 may be formed at the rear of the rest body 3100. The rest body 3100 may include a rest body center hole 3130, into which the center bar 3220 is inserted, and a rest body guide hole 3120, into which the second guide bar 3240 is inserted.

The rest body guide hole 3120 may have an arc shape of a predetermined angle about the rest body center hole 3130. The predetermined angle of the rest body guide hole 3120 may be 30 degrees. The rest body guide hole 3120 may have a smaller angle than the first guide hole 3730 or the second guide hole 3740.

The center bar 3220 may be provided at one surface of the rest body 3100 so as to protrude therefrom. The first guide bar 3230 may be coupled to the rest body 3110 so as to protrude from one surface of the rest body 3100 ahead of the center bar 3220. The second guide bar 3240 may extend through the rest body guide hole 3120 so as to protrude from one surface of the rest body 3100 behind the center bar 3220.

One surface of the rest body 3100 may be connected to the connection bracket 3700 so as to be turnable about the fourth axis of rotation 04, and the third cam 3200 may be connected to the other surface of the rest body 3100 so as to be turnable about the fourth axis of rotation 04. The third cam 3200, the rest body 3100, and the connection bracket 3700 may be connected to each other so as to be turnable about the center bar 3220. The center bar 3220 may be inserted through a center hole (not shown) of the third cam 3200, the rest body center hole 3130, and the connection bracket center hole 3720, or may be integrally formed with the third cam 3200 and may be inserted through the rest body center hole 3130 and the connection bracket center hole 3720.

Referring to FIG. 8, the third cam 3200 may have a triangular shape, and may include a first coupling portion 3251, to which the center bar 3220 is coupled, a second coupling portion 3252, to which the second guide bar 3240 is coupled, and a third coupling portion 3253, to which the gas cylinder 3400 is coupled, in the vicinity of vertices thereof. The first coupling portion 3251, the second coupling portion 3252, and the third coupling portion 3253 may form a triangular shape.

The center bar 3220 is turnably connected to the first coupling portion 3251 of the third cam 3200, and the third cam 3200 may be rotated relative to the rest body 3100 about the fourth axis of rotation 04. The second guide bar 3240 coupled to the second coupling portion 3252 is inserted into the second guide hole 3740 via the rest body guide hole 3120.

The third coupling portion 3253 is turnably connected to one end of the gas cylinder 3400, and may generate torque for the third cam 3200 about the fourth axis of rotation 04 according to extension and contraction of the gas cylinder 3400.

The gas cylinder 3400 may include an operation portion 3410 configured to change the flow path of inner gas according to positional movement thereof, a piston rod 3420 configured to be contracted and extended depending on an inner gas pressure difference, a cylinder 3430 configured to store gas therein, the piston rod 3420 extending through the cylinder 3430, and a cylinder connection portion 3440 provided at the end of the cylinder 3430, the cylinder connection portion 3440 being turnably connected to the third cam 3400.

The manipulation button 3500, which is a member configured to manipulate the gas cylinder 3400, may be provided at one side surface of the front end of the rest body 3100 at which an arm of a passenger sitting on the seat 1000 can be comfortably located.

The operation bracket 3600 may be provided between the manipulation button 3500 and the operation portion 3410 in order to transmit pressure of the manipulation button 3500 to the operation portion 3410 of the gas cylinder 3400.

Hereinafter, the operation of the armrest 3000 for car seats according to the other embodiment of the present invention will be described.

Figure 9A:
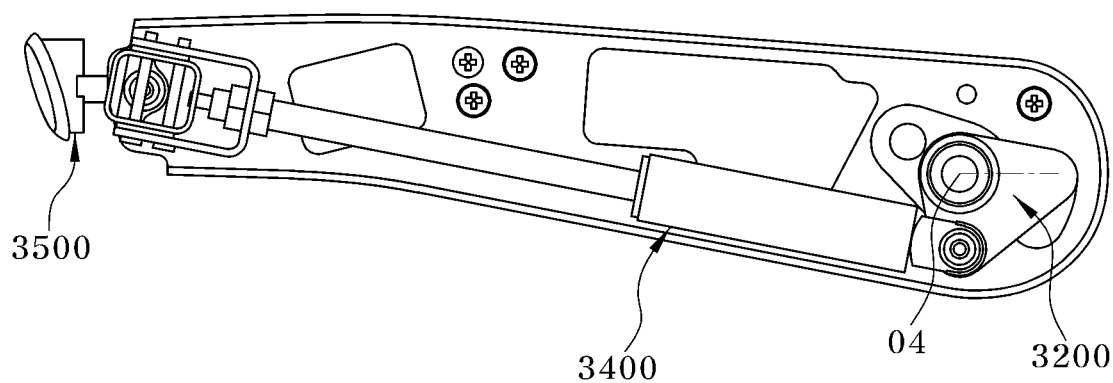
FIG. 9(a) is a view showing the extended state of a gas cylinder of the armrest for car seats according to the other embodiment of the present invention.
Figure 9B:
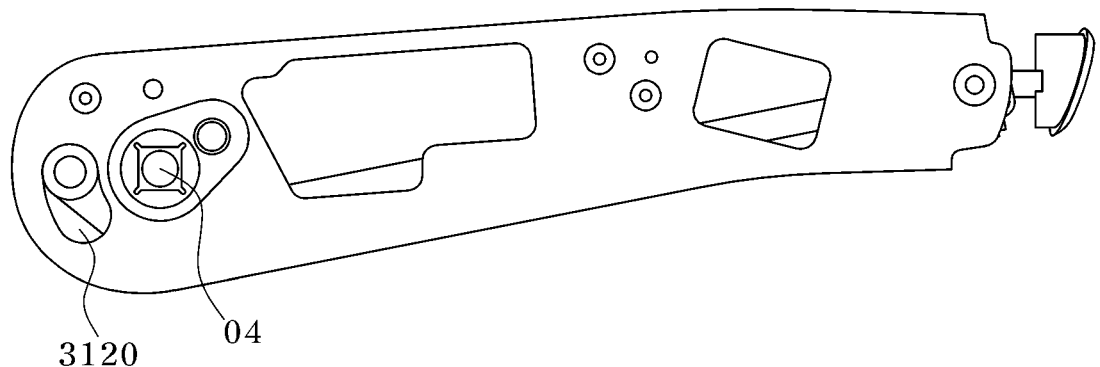
FIG. 9(b) is a view showing the extended state of a gas cylinder of the armrest for car seats according to the other embodiment of the present invention.
Figure 9C:
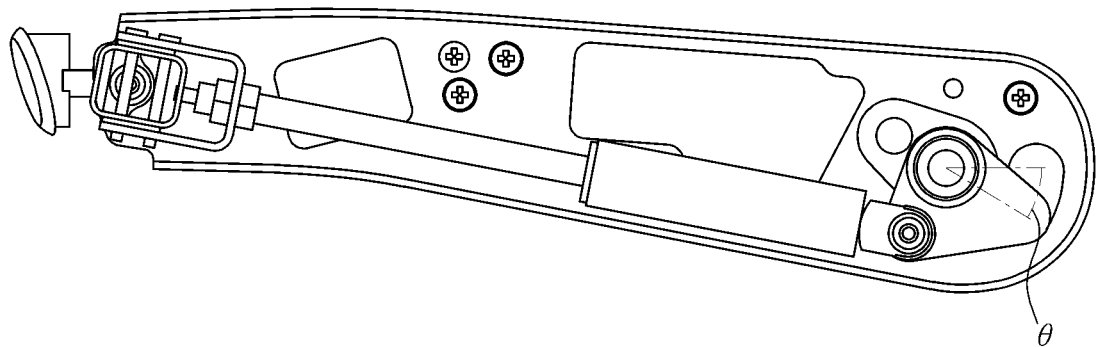
FIG. 9(c) is a view showing the contracted state of the gas cylinder of the armrest for car seats according to the other embodiment of the present invention.
Figure 9D:
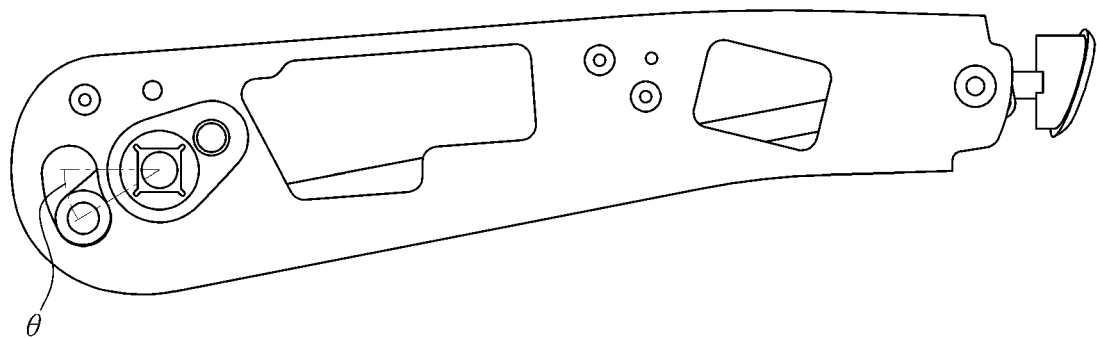
FIG. 9(d) is a view showing the contracted state of the gas cylinder of the armrest for car seats according to the other embodiment of the present invention.

FIGS. 9(a) and 9(b) are views showing the extended state of the gas cylinder of the armrest 3000 for car seats according to the other embodiment of the present invention. FIGS. 9(c) and 9(d) are views showing the contracted state of the gas cylinder of the armrest 3000 for car seats according to the other embodiment of the present invention.

Referring to FIGS. 9(a) and 9(b), the extended gas cylinder 3400 applies force to the third cam 3200 to rotate the third cam 3200 in the counterclockwise direction, and the third cam 3200 is rotated until the third cam 3200 cannot be rotated any more by the upper end of the rest body guide hole 3120.

Referring to FIGS. 9(c) and 9(d), when the manipulation button 3500 is pushed, the gas cylinder 3400 is in a contractible and extensible state. In this state, the gas cylinder 3400 cannot apply force necessary to rotate the third cam 3200 in the counterclockwise direction to the third cam 3200. The third cam 3200 is in a state in which the third cam 3200 can be rotated in the clockwise direction, and may be rotated to the lower end of the rest body guide hole 3120.

When the force applied to the manipulation button 3500 is released, the gas cylinder 3400 is in a lockup state in which the gas cylinder 3400 cannot be contracted and extended. The gas cylinder 3400 in this state limits rotation of the third cam 3200.

Figure 10A:
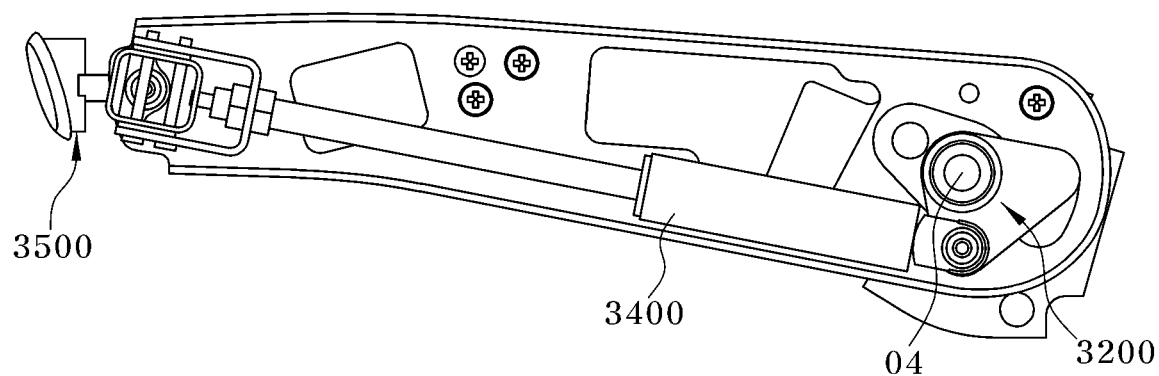
FIG. 10(a) is a view showing the horizontal state of the armrest for car seats according to the other embodiment of the present invention
Figure 10B:
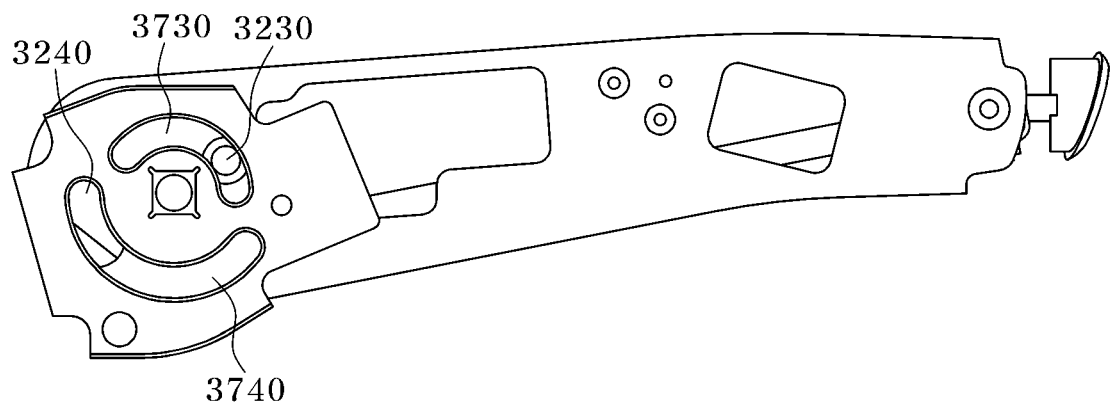
FIG. 10(b) is a view showing the horizontal state of the armrest for car seats according to the other embodiment of the present invention.
Figure 10C:
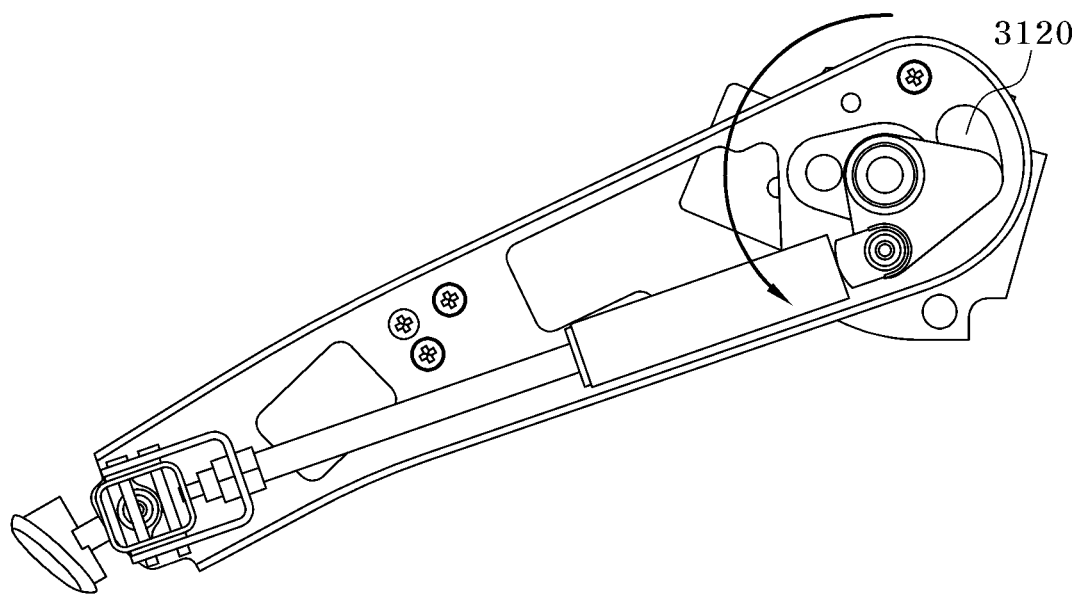
FIG. 10(c) is a view showing the downwardly rotated state of the armrest for car seats according to the other embodiment of the present invention.
Figure 10D:
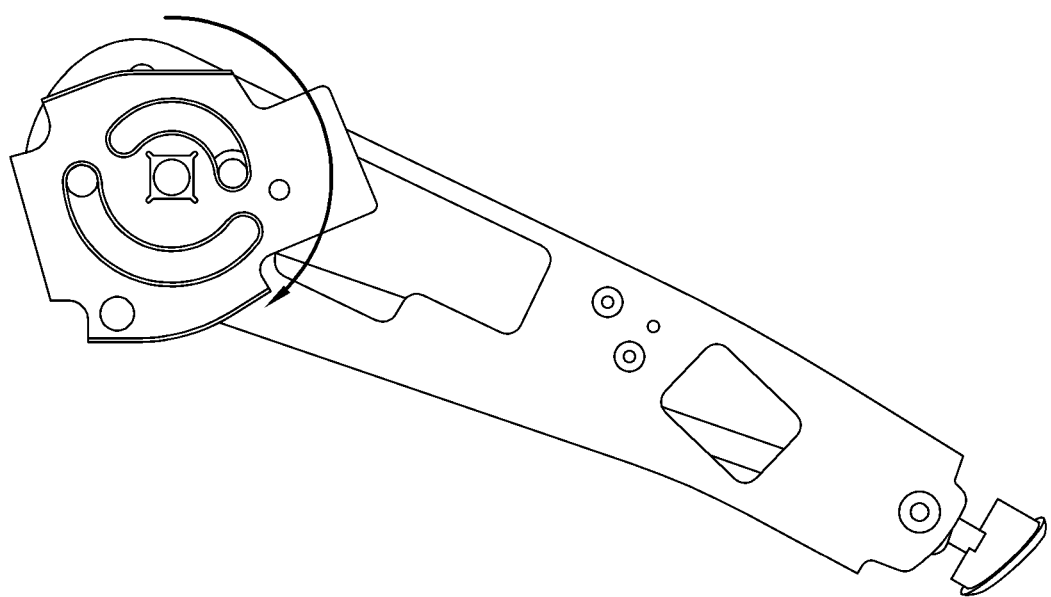
FIG. 10(d) is a view showing the downwardly rotated state of the armrest for car seats according to the other embodiment of the present invention.
Figure 11A:
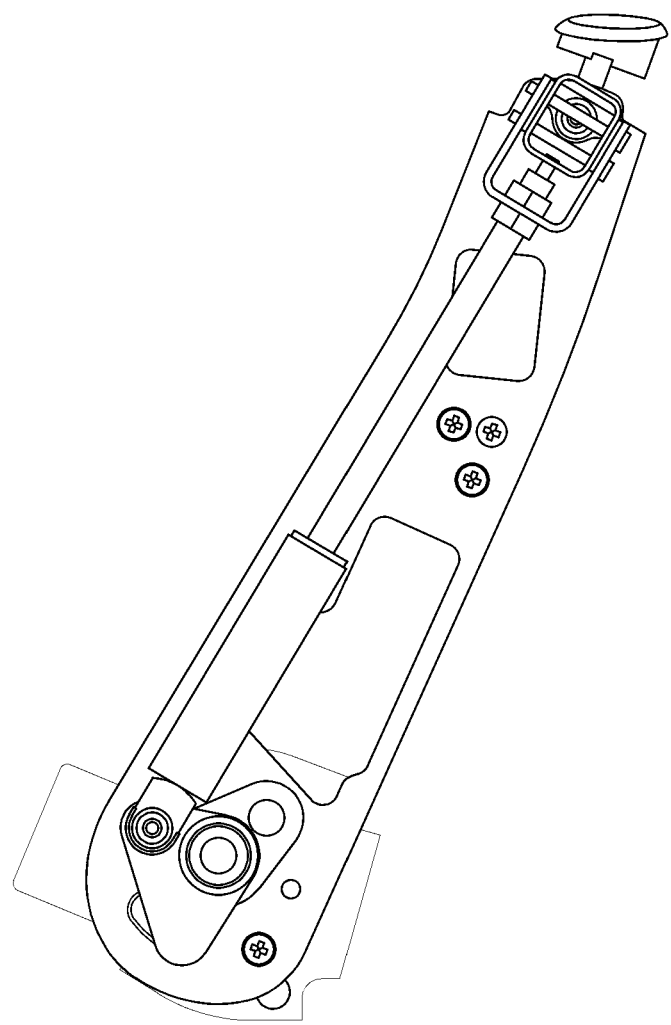
FIG. 11(a) a view showing the upwardly rotated state of the armrest for car seats according to the other embodiment of the present invention.
Figure 11B:
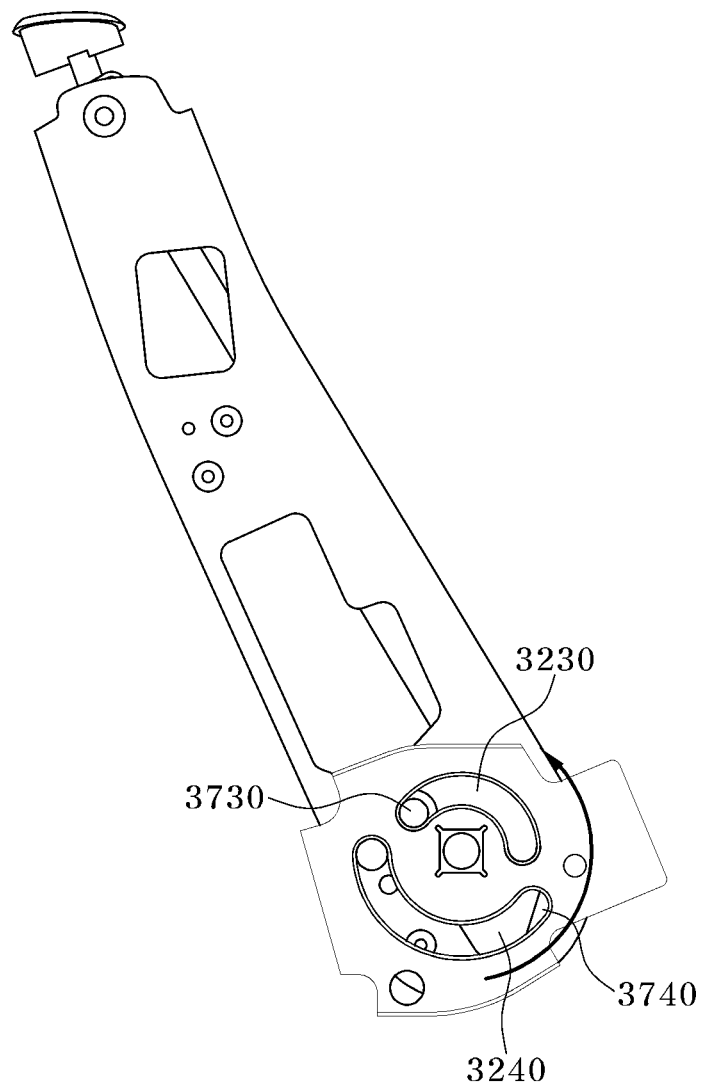
FIG. 11(b) is showing the upwardly rotated state of the armrest for car seats according to the other embodiment of the present invention.
Figure 12A:
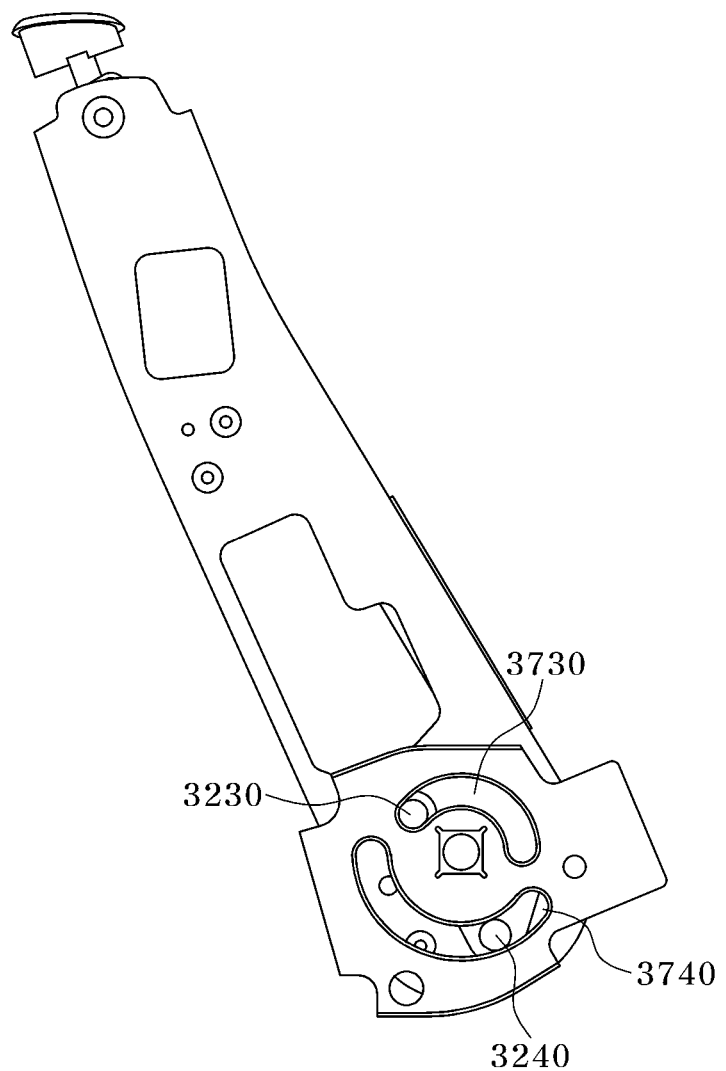
FIG. 12(a) is a view identical to FIG. 11(b), showing the extended state of the gas cylinder.
Figure 12B:
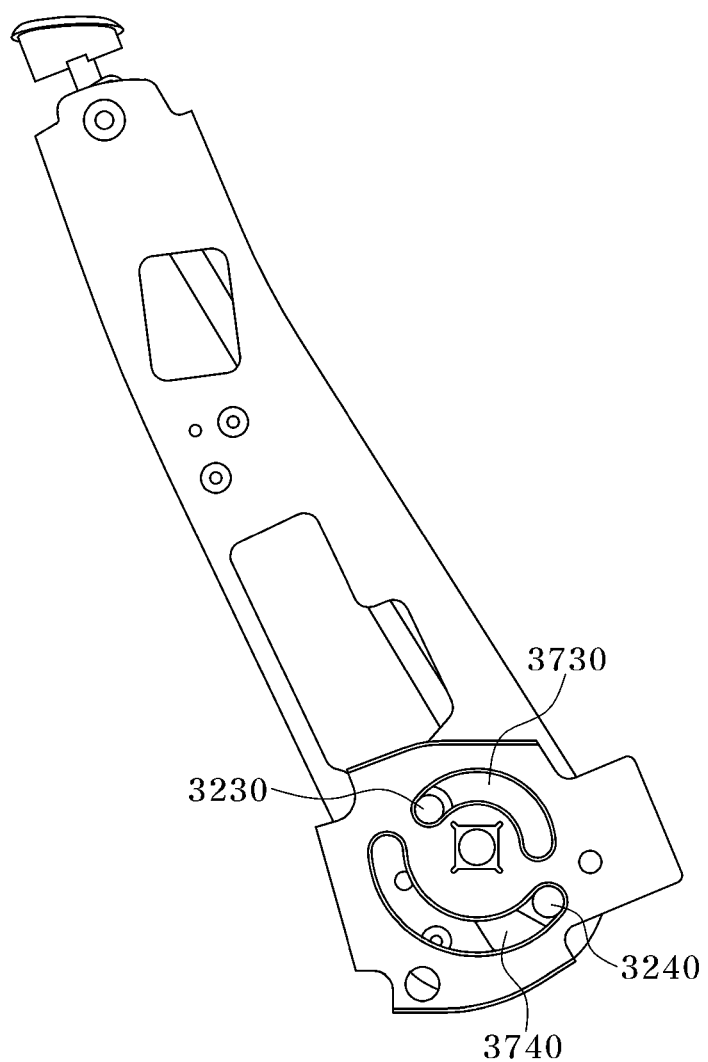
FIG. 12(b) is a view showing the contracted state of the gas cylinder.

FIGS. 10(a) and 10(b) are views showing the horizontal state of the armrest 3000 for car seats according to the other embodiment of the present invention. FIGS. 10(c) and 10(d) are views showing the downwardly rotated state of the armrest 3000 for car seats according to the other embodiment of the present invention. FIGS. 11(a) and 11(b) are views showing the upwardly rotated state of the armrest 3000 for car seats according to the other embodiment of the present invention. FIG. 12(a) is a view identical to FIG. 11(b), showing the extended state of the gas cylinder, and FIG. 12(b) is a view showing the contracted state of the gas cylinder.

The armrest 3000 in the horizontal state will be described with reference to FIGS. 10(a) and 10(b). The third cam 3200 is in the state in which the third cam 3200 is maximally rotated in the counterclockwise direction by the extended gas cylinder 340, and movement of the second guide bar 3240 of the third cam 3200 is limited by the upper end of the second guide hole 3740. Consequently, the armrest 3000 is maintained in the state in which the armrest 3000 is not rotated downwards due to weight thereof but is horizontally disposed.

The armrest 3000 in the downwardly rotated state will be described with reference to FIGS. 10(c) and 10(d). When the manipulation button 3500 is pushed, the gas cylinder 3400 is in a contractible and extensible state, and the length of the gas cylinder 3400 may be adjusted by external force. When external force is applied to the armrest 3000 so as to be rotated downwards in this state, the third cam 3200 may be rotated in the clockwise direction until movement of the second guide bar 3240 is limited by the lower end of the rest body guide hole 3120. In addition, the armrest 3000 may be rotated downwards until movement of the first guide bar 3230 fixed to the rest body 3100 is limited by one end of the first guide hole 3730.

The armrest 3000 in the upwardly rotated state will be described with reference to FIGS. 11(a) and 11(b). When the manipulation button 3500 is not pushed, the length of the gas cylinder 3400 is maintained fixed. When external force is applied to the armrest 3000 in the horizontal state as shown in FIGS. 10(a) and 10(b) to rotate the armrest 3000 upwards without pushing the manipulation button 3500, the armrest 3000 may be rotated upwards until movement of the first guide bar 3230 fixed to the rest body 3100 is limited by the other end of the first guide hole 3730. The armrest 3000 may be rotated so as to be inclined rearwards more than the vertical state thereof.

FIG. 12(a) shows the case in which the armrest 3000 in the horizontal state as shown in FIGS. 10(a) and 10(b) is rotated upwards without pushing the manipulation button 3500. The first guide bar 3230 is moved to the other end of the first guide hole 3730; however, the second guide bar 3240 is not moved to the other end of the second guide hole 3740.

FIG. 12(b) shows the case in which the armrest 3000 in the downwardly inclined state as shown in FIGS. 10(c) and 10(d) is rotated upwards without pushing the manipulation button 3500. The first guide bar 3230 is moved to the other end of the first guide hole 3730, and the second guide bar 3240 is moved to the other end of the second guide hole 3740.

The armrest 3000 for car seats according to the other embodiment of the present invention has the effect of pushing back the armrest 3000 in the downwardly inclined state at the same rotation angle as when the armrest 3000 in the horizontal state is pushed back.

As is apparent from the foregoing, the present invention has the following effects.

In the armrest for car seats according to the present invention, the axis of rotation of the rest body and the axis of rotation of the cam configured to adjust multistage rotation of the armrest may be located at different positions, whereby force necessary to adjust multistage rotation of the armrest may be reduced.

In the armrest for car seats according to the present invention, the cam may have a two-bar link structure, whereby operation force through indirect driving may be reduced, and the length of the armrest may be further increased through adjustment of the rotational position of the link.

In the armrest for car seats according to the present invention, the armrest may be rotated until the armrest is pushed back in parallel to the car seat in both the horizontal state and the downwardly inclined state of the armrest.

The effects of the present invention are not limited to those mentioned above, and other unmentioned effects will be clearly understood by an ordinary skilled person from the above description.

It will be apparent to a person of ordinary skill in the art that the present invention described above is not limited to the above embodiments and the accompanying drawings and that various substitutions, modifications, and variations can be made without departing from the technical idea of the present invention.

What is claimed is:

1. An armrest for a car seat, the armrest comprising:
   a connection bracket coupled to the car seat;
   a rest body connected to the connection bracket so as to be turnable about a main axis of rotation;
   a main cam connected to the rest body so as to be turnable about the main axis of rotation;
   a gas cylinder connected to the main cam, the gas cylinder being configured to be extended and contracted in a longitudinal direction; and
   a manipulation button installed at the rest body, the manipulation button being configured to manipulate the gas cylinder,
   wherein the rest body comprises a first guide bar coupled to one surface of the rest body, the first guide bar being inserted into a first guide hole formed in the connection bracket the first guide bar being configured to limit a turning angle of the armrest,
   wherein the main cam comprises a second guide bar protruding from one end of the main cam, the second guide bar extending through a rest body guide hole formed in the rest body and a second guide hole formed in the connection bracket,
   the second guide bar being configured to limit a rotation angle of the armrest,
   the main cam comprises a first coupling portion, at which the main axis of rotation is formed, a second coupling portion, at which the second guide bar is formed, and a third coupling portion directly connected to the gas cylinder, and
   the first coupling portion, the second coupling portion, and the third coupling portion form a triangular shape.

2. The armrest according to claim 1, wherein the first coupling portion is located ahead of the second coupling portion and is located higher than the third coupling portion.

3. The armrest according to claim 1, wherein the first guide hole is disposed closer to the main axis of rotation than the second guide hole.

4. The armrest according to claim 1, wherein the first guide hole has a smaller radius of curvature than the second guide hole.

* * * * *